(No Model.)

W. V. TASCHER.
HORSE COLLAR PAD.

No. 577,465. Patented Feb. 23, 1897.

Witnesses:
Harry Pagle.
Maggie Oltsch.

Inventor.
William V. Tascher.
By George Oltsch,
Att'n'y.

THE NORRIS PETERS CO., PHOTO-LITHO., WASHINGTON, D. C.

UNITED STATES PATENT OFFICE.

WILLIAM V. TASCHER, OF MISHAWAKA, INDIANA.

HORSE-COLLAR PAD.

SPECIFICATION forming part of Letters Patent No. 577,465, dated February 23, 1897.

Application filed November 20, 1895. Serial No. 569,559. (No model.)

*To all whom it may concern:*

Be it known that I, WILLIAM V. TASCHER, a citizen of the United States, residing at Mishawaka, in the county of St. Joseph and State of Indiana, have invented certain new and useful Improvements in Horse-Collar Pads; and I do hereby declare the following to be a full, clear, and exact description of the invention, such as will enable others skilled in the art to which it appertains to make and use the same.

My invention relates to an improvement in harness-collar pads; and it consists in a perforated sweat-pad, a perforated saddle, which is secured to the top thereof, and a pivoted rocking cap upon which the horse-collar rests, as will be more fully described hereinafter.

The object of my invention is to provide a pad to support the horse-collar where the horse has become sore or galled, and which pad fits over and around the sore place without coming in contact with it, thus allowing free ventilation of the affected part and also preventing any pressure thereon.
Another object is to support the collar in such a manner that it is allowed a free movement without causing the pad to rub and chafe the body.

Figure 1:
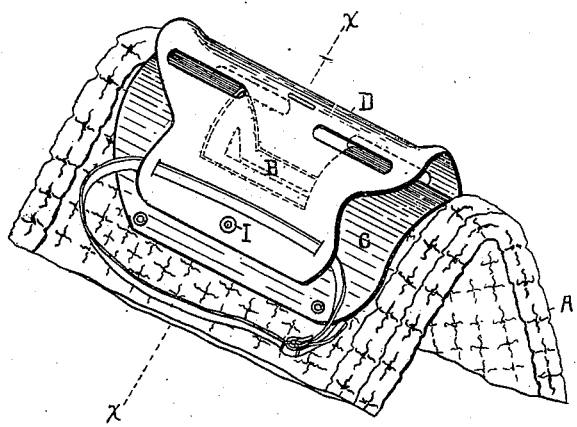
Figure 2:
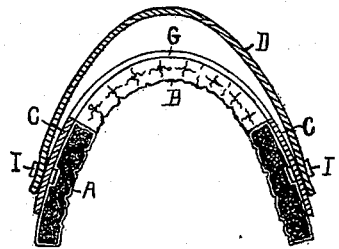

In the accompanying drawings, Figure 1 is a perspective of a pad which embodies my invention. Fig. 2 is a transverse sectional view on the line *x x* of Fig. 1.

A represents the pad, such as is commonly used under the ordinary collar when the horse has become galled or sore, and through the top of which is made an opening B sufficiently large to fit around the sore portion without coming in contact with it. Secured by means of rivets or other suitable fastenings to this pad is a saddle portion C, having an opening G through it, which corresponds to the opening B in the pad. Riveted or otherwise secured at the center of its lower edges to the saddle portion C is the rocking cap portion D, which covers over the openings B and G, upon which the horse-collar rests. This cap portion D, being loosely attached to the saddle C by the two rivets I, has a longitudinal rocking or tilting motion, so as to prevent the animal from being rubbed or chafed by the movement of the pad.

It is the rubbing of the collar which causes the sweat-pad to rub and chafe the animal, but if the collar is supported upon a pivoted rocking cap portion, as here shown, the pad will remain stationary and the sore portion will not be rubbed and irritated.

By means of the construction here shown after a horse's neck has become sore it can continue to be used without injury or cruelty to the animal and the sore place allowed to heal without interference.

Having thus described my invention, I claim—

A pad having an opening B, a saddle portion C with a corresponding opening fastened thereto, and a rocking support D, elevated above and pivoted to the saddle portion at or near the center of its lower edges, substantially as shown and described.

In testimony whereof I affix my signature in presence of two witnesses.

WILLIAM V. TASCHER.

Witnesses:
ALX. WILHELM,
FRANK FRIES.